United States Patent [19]

West

[11] Patent Number: 5,014,544
[45] Date of Patent: May 14, 1991

[54] METHOD AND APPARATUS FOR DETECTING CRACKS IN HELICOPTER ROTOR BLADES

[75] Inventor: Christopher N. West, Somerset, England

[73] Assignee: Westland Helicopters Limited, Somerset, England

[21] Appl. No.: 371,094

[22] Filed: Jun. 26, 1989

[30] Foreign Application Priority Data

Jul. 4, 1988 [GB] United Kingdom ............... 8815826

[51] Int. Cl.⁵ ............................................. G01M 3/22
[52] U.S. Cl. ..................... 73/40.7; 73/104; 416/61
[58] Field of Search ............... 73/40.7, 40, 104, 762; 116/212; 416/61

[56] References Cited

U.S. PATENT DOCUMENTS

| | | | |
|---|---|---|---|
| 3,667,862 | 6/1972 | Parr | 73/40 X |
| 3,691,820 | 9/1972 | Fiore | 73/40.7 |
| 4,104,906 | 8/1978 | Oertle | 73/40 X |
| 4,135,386 | 1/1979 | Peterson et al. | 73/40 |
| 4,373,862 | 2/1983 | Ferris et al. | 73/40.7 X |
| 4,376,421 | 3/1983 | Skinner | 116/211 |

FOREIGN PATENT DOCUMENTS 382548 10/1974 U.S.S.R. ........................... 73/40.7

Primary Examiner—Hezron E. Williams
Assistant Examiner—Joseph W. Roskos
Attorney, Agent, or Firm—Larson & Taylor

[57] ABSTRACT

A method for detecting a crack in the main load bearing spar of a hilicopter rotor blade consists of attaching a capillary tube along an external surface of the spar and connecting the interior of the tube to a supply of colored liquid contained in a reservoir at a root end of the blade, whereby a crack in the spar causes a corresponding crack in the capillary tube resulting in visible leakage of the colored liquid.

9 Claims, 3 Drawing Sheets

METHOD AND APPARATUS FOR DETECTING CRACKS IN HELICOPTER ROTOR BLADES

BACKGROUND OF THE INVENTION

1. Field of the Invention

This invention relates to a method and apparatus for detecting cracks in a main load bearing spar of a helicopter rotor blade.

2. Description of the Prior Art

GB-A- 1218954 describes a crack detection system in which the interior of a hollow spar is pressurised and an indicator is provided to indicate any loss of pressure such as may be caused by a crack in the spar. This device requires special seals at the root and tip ends of the blade which increases the weight of the blade and can result in erroneous indications of a crack in the event of a small leak past a seal.

Furthermore, such a system cannot easily be adapted for use with modern composite blades in which a load bearing spar and trailing edge portion may be wrapped in outer layers of fibre-reinforced material which can preclude the escape of gas from a crack in the spar to provide an erroneous indication of structural integrity. GB-A-1361174 proposes one solution to this problem in that gas escape channels are provided along what are determined as the most vulnerable crack propagation areas in order to provide a gas escape route; however, such a system has practical lixitations.

GB-A-2108065 discloses a helicopter rotor blade to hub arm attachment incorporating an integrity monitoring system which includes a small annulus between a pre-loaded central bolt and an internal bore of the hub arm filled with a dye. The dye is pressurised by a bellows so as to leak through any crack occuring in the spindle to indicate a fault by visual inspection. Such a system is not applicable to the aforementioned problem of detecting cracks in a hollow load bearing rotor blade spar due to its large internal volume and the complex dynamic characteristics required during operation.

US-A-4135386 discloses a method and related apparatus for detecting cracks in porous material. The method comprises affixing a frangible fluid impermeable enclosure to the surface, creating a pressure differential between the interior and exterior of the enclosure and monitoring the internal pressure in the enclosure. A crack in the permeable material destroys the integrity of the enclosure, which in an embodiment consists of glass tube, and pressure sensor means are provided to detect a resulting pressure change. In preferred embodiments a vacuum is created within the enclosure. The requirement to provide monitoring and sensor means again precludes such a system for use in the detection of cracks in a hollow helicopter rotor blade spar.

SUMMARY OF THE INVENTION

Accordingly, in one aspect this invention provides a method for detecting a crack in a main load bearing spar of a helicopter rotor blade which together with a trailing edge portion defines a blade chord, comprising attaching a capillary tube longitudinally along an external surface of the blade at a chord station within that defined by the spar and connecting the interior of the capillary tube to a supply of coloured liquid contained in a reservoir at a root end of the blade whereby a crack occuring in the spar causes a corresponding crack in the capillary tube resulting in a leakage of the coloured liquid to provide a visual indication that a crack has occurred.

Preferably a capillary tube is attached to both upper and lower surfaces of the rotor blade.

The method may include the further step of pressurising the reservoir, and the capillary tube may be manufactured from material having physical properties similar to that of the spar.

In another aspect the invention provides a helicopter rotor blade having a main load bearing spar and a trailing edge portion together defining a blade chord, and including crack detection means comprising a reservoir at a root end of the blade for containing a coloured liquid and connected internally to a capillary tube attached to an external surface of the rotor blade so as to extend longitudinally of the blade and at a chordal position within that defined by the spar, whereby a crack in the spar causes a corresponding crack in the capillary tube resulting in leakage of the coloured liquid to provide a visual indication of the spar crack.

Preferably, a capillary tube is attached along both upper and lower surfaces of the rotor blade, and may be located at about 25 per cent chord station.

The load bearing spar and capillary tube are conveniently of material having sixilar fatigue properties and in one embodiment are both of stainless steel.

BRIEF DESCRIPTION OF THE DRAWINGS

The invention will now be described by way of example only and with reference to the accompanying drawings in which.

DETAILED DESCRIPTION OF THE DRAWINGS

Figure 1:
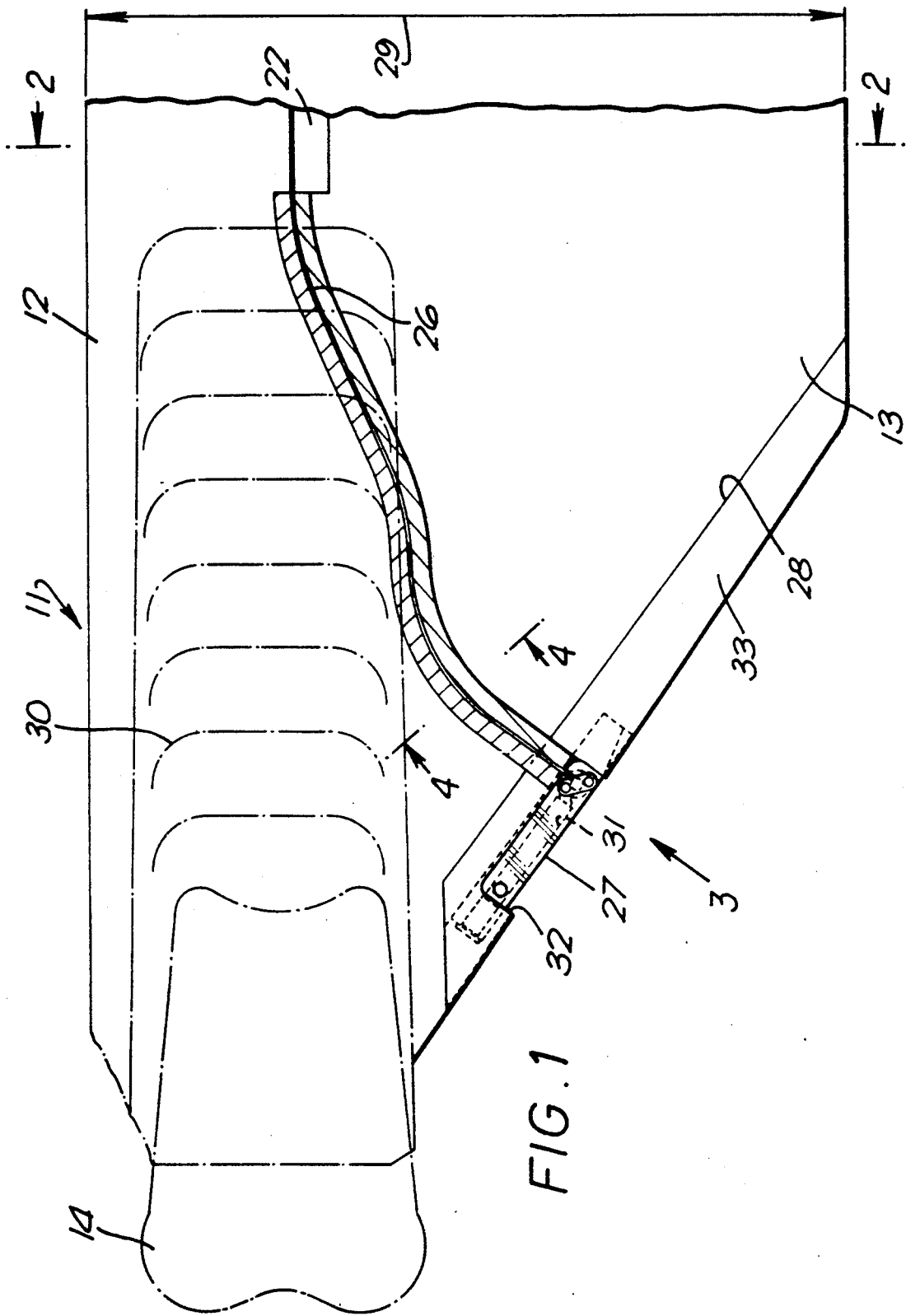
FIG. 1 is a fragmentary external view of a helicopter rotor blade according to the invention.

A helicopter rotor blade 11 includes a hollow stainless steel load bearing spar 12 forming the leading edge portion of the blade and a trailing edge portion 13 together defining a blade chord 29. A plurality of root end doubler plates 30 and a blade attachment cuff 14 are bonded and bolted to the root end of the spar 12 to facilitate attachment of blade 11 to a rotor head (not shown).

Figure 2:
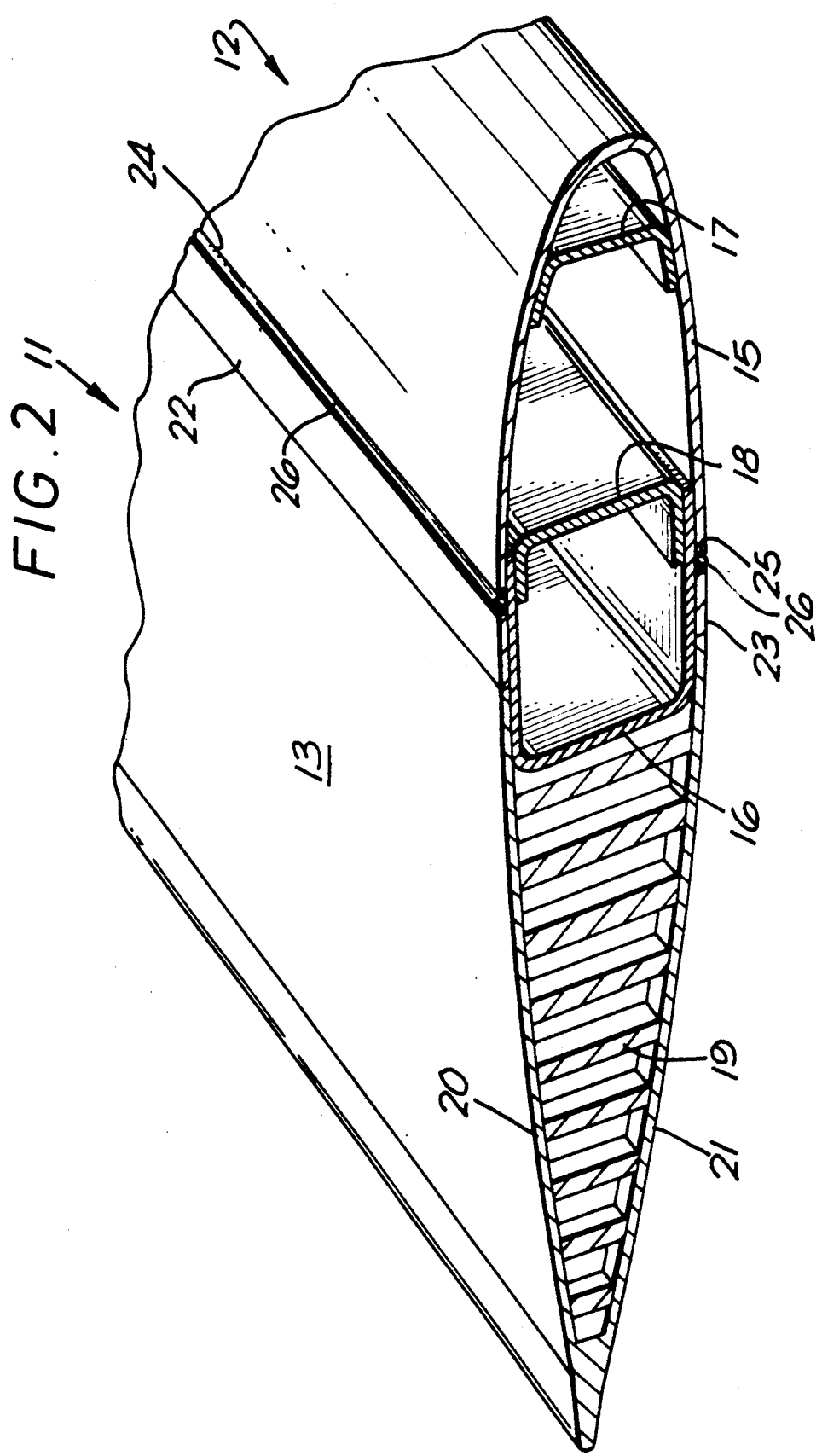
FIG. 2 is a perspective sectioned view taken on lines 2—2 of FIG. 1.
Figure 3:
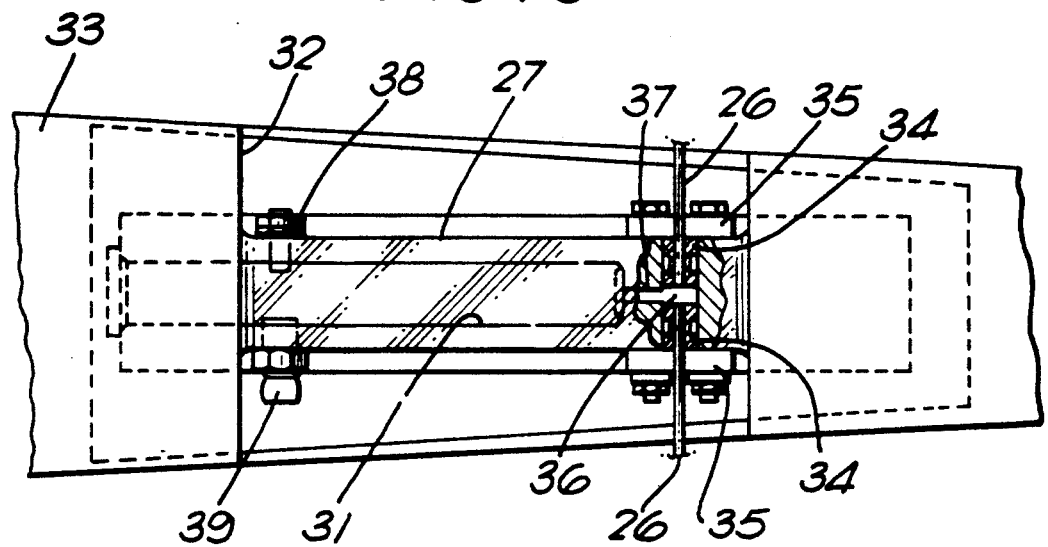
FIG. 3 is a fragmentary part-sectioned view taken on arrow 3 of FIG. 1.

As shown in FIG. 2 spar 12 is a bonded assembly comprising a stainless steel generally U-shaped leading edge channel 15 closed by a U-shaped rear channel 16 and supported internally by a nose channel 17 and a channel 18 located at about the blade 25 per cent chord station.

Trailing edge portion 13 consists of honeycomb filler 19 covered by upper and lower fibre reinforced skins 20 and 21 having forwardly extended portions bonded to the external surface of the rear channel 16.

Strengthening doublers 22 and 23 extend longitudinally from the blade root end partially along the blade span and are bonded to the external surfaces of the channel 16 to define upper and lower grooves 24 and 25 between a forward edge of the doublers 22 and 23 and a rear edge of the legs of leading edge channel 15.

Grooves 24 and 25 are located at about the blade 25 per cent chord station.

A stainless steel capillary tube 26 having a 1.0mm (0.040 inch) outside diameter and a 0.64mm (0.025 inch) inside diameter is bonded in each of the grooves 24 and 25 using an adhesive (not shown) and extends longitudinally from the blade root end throughout about 70 per cent of the span of the blade 11. It is important to ensure that direct contact occurs between the external surfaces of the capillary tubes 26 and the channel 16.

At the blade root end the capillary tubes 26 are connected to the interior of an injection moulded transparent reservoir 27 containing a coloured liquid dye in an internal cavity 31.

The reservoir 27 is located in a cut-out 32 in a fairing 33 bonded to an angled trailing edge 28 of trailing edge portion 13.

Inner ends of the respective capillary tubes 26 are supported in spigots 34 retained in a bore at one end of the reservoir 27 by integral bolted brackets 35, and open into a central cavity 36 connected via a drilling 37 to the internal cavity 31. A bleed bolt 38 and charging nipple 39 are threaded in the wall of the reservoir in communication with the cavity 31 to facilitate charging of the reservoir 27 with coloured liquid to a desired level.

Figure 4:
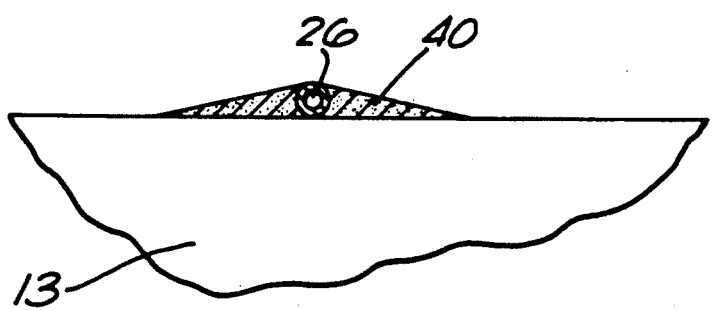
FIG. 4 is a fragmentary sectioned view taken on line 4—4 of FIG. 1.

Between the inner ends of grooves 24 and 25 and the reservoir 27 the capillary tubes 26 are bonded to the respective external surfaces of the root end doublers 30 and the trailing edge portion 13, i.e. in the cross-hatched area of FIG. 1, and the tubes 26 are attached using a tapered fillet of adhesive 40 as shown in FIG. 4.

If, during operation, blade loading is such as to cause a crack in the wall of the load bearing stainless steel spar 12, a crack will also occur in one or both of the capillary tubes 26 and in the general vicinity of the crack in the spar. The liquid in the capillary tubes 26 is automatically pressurised during rotation of the rotor blade 11 due to centrifugal force so that a crack in the capillary tube 26 will result in leakage of the coloured liquid to provide a visual indication of the occurrence of a crack in the spar 12 on subsequent ground inspection.

Fatigue tests of a blade sample incorporating a stress raiser comprising a drilled hole through one wall of the spar 12 at a known critical span station and using single level vibratory bending in the blade flap mode with centrifugal loading has shown good correlation between the position of a subsequent crack in the spar wall and a resulting crack in the capillary tube.

In the fatigue tests the reservoir was pressurised resulting in clearly visible leakage of the coloured liquid from the crack in the capillary tube, and whirl tests of a blade having an unpressurised reservoir have shown that centrifugal forces are sufficient to ensure leakage from a crack occuring during rotation.

Whilst one embodiment has been described and illustrated it will be understood that many modifications may be made without departing from the scope of the invention. For example, the invention can be used with rotor blades having other forms of load bearing spar and a spar of other materials, the properties of the capillary tubes being selected appropriately so as to be of the same material or of a material having similar fatigue properties. In the illustrated embodiment the grooves 24 and 25 provide a convenient location for the circular section capillary tubes; however, the grooves are not essential and the capillary tubes can be mounted on the external surfaces of the blade and at any preferred chordal position within that defined by the load bearing spar. In such a modification it may be preferable, in order to ensure an efficient bond between the surfaces, to use a capillary tube having a flat surface. Alternatively a circular section capillary tube could be bonded to a flat support which in turn is bonded to the surface of the structure. The reservoir may be pressurised, for example through a suitable valve means, to ensure that leakage occurs whilst the blade is stationary, and any suitable liquid dye such as an alcohol based liquid may be used.

What is claimed is:

1. A method for detecting a crack in a main load bearing spar of a helicopter rotor blade which together with a trailing edge portion defines a blade chord, comprising attaching a capillary tube longitudinally along an external surface of the blade at a chord station within that defined by the spar and connecting the interior of the tube to a supply of coloured liquid contained in a reservoir at a root end of the blade whereby a crack occuring in the spar causes a corresponding crack in the capillary tube resulting in leakage of the coloured liquid to provide a visual indication that a crack has occurred.

2. A method according to claim 1, wherein a capillary tube is attached to both upper and lower external surfaces of the rotor blade.

3. A method according to claim 1, including the further step of pressurising the reservoir.

4. A method according to claim 1, wherein the capillary tube is manufactured from material having similar fatigue properties to that of the spar.

5. A helicopter rotor blade having a main load bearing spar and a trailing edge portion together defining a blade chord, and crack detection means comprising a reservoir at a root end of the blade for containing a coloured liquid and connected internally to a capillary tube attached to an external surface of the rotor blade so as to extend longitudinally of the blade and at a chordal position within that defined by the spar, whereby a crack in the spar causes a corresponding crack in the capillary tube resulting in leakage of the coloured liquid to provide a visual indication of the spar crack.

6. A rotor blade as claimed in claim 5, having a capillary tube attached along both upper and lower external surfaces of the rotor blade.

7. A rotor as claimed in claim 5, wherein the capillary tube is located at about a ≅per cent chord station.

8. A rotor blade as claimed in claim 5, wherein the load bearing spar and capillary tube are of similar material.

9. A rotor blade as claimed in claim 8, wherein the load bearing spar and capillary tube are both formed of stainless steel.

* * * * *